United States Patent Office 2,792,415
Patented May 14, 1957

2,792,415
PURIFICATION OF ACRYLONITRILE

Thomas D. Higgins, Jr., Texas City, Tex., assignor to Monsanto Chemical Company, St. Louis, Mo., a corporation of Delaware No Drawing. Application May 19, 1955,
Serial No. 509,696

3 Claims. (Cl. 260—465.9)

This invention relates to the purification of acrylonitrile. More specifically, it relates to a process for treating acrylonitrile containing minor amounts of carbonyl-containing impurities for the removal of such impurities therefrom.

Acrylonitrile is a well known article of commerce widely used in the manufacture of synthetic resins and fibers. It is also a valuable intermediate in the synthesis of many organic compounds. In most applications, it is essential that the acrylonitrile be in as pure a state as possible because even minute traces of impurities are often a direct cause of either extremely low yields of the desired products or inferior qualities in the end product. This is particularly true when acrylonitrile is used in the preparation of synthetic resins and fibers. In most of the processes for producing this nitrile, minor amounts of carbonyl-containing compounds, particularly methyl vinyl ketone, are simultaneously produced. The presence of even very small quantities of this impuritiy renders the acrylonitrile unsuitable in many applications.

Accordingly, it is an object of this invention to provide a process for the removal of minor amounts of methyl vinyl ketone from acrylonitrile.

Other objects and advantages of the invention will become apparent from the following description of the process.

It has now been discovered that minor amounts of methyl vinyl ketone can be removed from acrylonitrile in a simple and convenient manner by treating acrylonitrile containing minor amounts of methyl vinyl ketone with hydrogen chloride, preferably hydrochloric acid. The contaminated acrylonitrile is merely stirred or agitated with the acid and following the acid treatment, excess acid in the acrylonitrile is removed by any suitable means.

The invention is illustrated by the following example which, however, is not to be considered as limiting in any manner.

Example

A series of 100-gram samples (125 ml.) of acrylonitrile containing 500 parts of methyl vinyl ketone per million parts of acrylonitrile were treated by adding varying quantities of concentrated (37%) hydrochloric acid to each of them individually, stirring for a period of from 1 to 10 minutes at room temperature, and then passing them through a 50-ml. burette packed with a weakly basic anion exchange resin of the polyamine type known to the trade under the trademark "Permutit W." The effluents from the ion exchange column were analyzed for methyl vinyl ketone content by both polarographic and mass spectrometric techniques. The results obtained are tabulated below.

| Sample No. | HCl Added (ml.) | Contact Time (min.) | Mole Ratio HCl/MVK [1] | Methyl Vinyl Ketone Content After Treatment (p. p. m.) |
|---|---|---|---|---|
| 1 | 0.06 | 10 | 1.0 | 140 |
| 2 | 0.08 | 10 | 1.33 | 120 |
| 3 | 0.1 | 10 | 1.67 | 100 |
| 4 | 0.12 | 10 | 2.0 | <100 |
| 5 | 0.14 | 10 | 2.33 | <100 |
| 6 | 0.16 | 10 | 2.67 | <50 |
| 7 | 0.18 | 10 | 3.0 | <50 |
| 8 | 0.2 | 10 | 3.3 | <50 |
| 9 | 0.2 | 1 | 3.3 | <50 |
| 10 | 0.2 | 5 | 3.3 | <50 |

[1] Methyl vinyl ketone.

The preceding data effectively demonstate the efficiency of the hydrochloric acid treatment for removing methyl vinyl ketone from acrylonitrile contaminated therewith.

It will be immediately obvious that many variations in procedure may be made without departing from the scope of the invention. The amount of acid employed, for example, as well as the time of contact required may be varied, depending upon the rigidity of the specifications set for the final product. Quantities of acid from the minimum stoichiometric amount required to react with the methyl vinyl ketone present, that is, one mole of hydrochloric acid for each mole of methyl vinyl ketone, up to three-, four-, or even five-fold excess may be employed and time for treatment may be varied over periods from as little as one minute to as much as thirty minutes. Generally, at contact times of ten minutes, the methyl vinyl ketone content of acrylonitrile may be successfully reduced to satisfactorily low levels by treating the acrylonitrile containing methyl vinyl ketone with an amount of hydrochloric acid such that the mole ratio of the acid used to the methyl vinyl ketone present lies in the range from about 2.5 to about 3.3.

Although concentrated hydrochloric acid containing from about 25% to about 37% HCl by weight is preferred, aqueous solutions of HCl containing as low as 1% HCl can also be employed or the contaminated acrylonitrile can be treated with anhydrous hydrogen chloride by bubbling the latter through it, for example.

The treatment is ordinarily effected at room temperature (about 25° C.), no heat being required. However, the process of the invention can be carried out over a wide temperature range, varying from 0° C. to approximately 78° C., the boiling point of acrylonitrile. To prevent substantial losses of acrylonitrile, however, the process is preferably carried out at a temperature between about 20° C. and 40° C.

After treatment, the excess acid may be neutralized with dilute sodium hydroxide solution and the treated acrylonitrile distilled to recover purified acrylonitrile. Alternatively, the treated acrylonitrile may be passed through a bed of a weakly basic anion exchange resin to remove the unreacted hydrochloric acid. Suitable resins for such use are those of the polyamine type such as phenol-formaldehyde polyamine resins and polystyrene-base polyamine resins. Anion exchange resins suitable for use in the present invention are, for example, those known commercially under the trademarks "Permutit W," "De-Acidite," and "Amberlite IR-45."

If desired, the effluent from the exchange column may be distilled if it is desired to remove all traces of the hydrohalogenated methyl vinyl ketone product from the acrylonitrile.

What is claimed is:

1. A process for the removal of methyl vinyl ketone from acrylonitrile containing minor amounts of methyl vinyl ketone which comprises contacting said acrylonitrile with at least one mole of hydrochloric acid for each mole of methyl vinyl ketone to be removed, at a temperature in the range of from about 0° C. to about 73° C., and recovering acrylonitrile.

2. A process for the removal of methyl vinyl ketone from acrylonitrile containing minor amounts of methyl vinyl ketone which comprises contacting said acrylonitrile with at least one mole of hydrochloric acid for each mole of methyl vinyl ketone to be removed, at a temperature in the range of from about 20° C. to about 40° C., and recovering acrylonitrile.

3. A process for the removal of methyl vinyl ketone from acrylonitrile containing minor amounts of methyl vinyl ketone which comprises contacting said acrylonitrile with at least one mole of hydrochloric acid for each mole of methyl vinyl ketone to be removed, at a temperature in the range of from about 20° C. to about 40° C., passing the treated acrylonitrile through a bed of a weakly basic anion exchange resin to remove excess hydrochloric acid, and recovering acrylonitrile.

References Cited in the file of this patent

UNITED STATES PATENTS

| | | |
|---|---|---|
| 2,382,383 | Carpenter | Aug. 14, 1945 |
| 2,385,549 | Spence | Sept. 25, 1945 |
| 2,389,607 | Britton et al. | Nov. 27, 1945 |
| 2,429,031 | Robinson | Oct. 14, 1947 |
| 2,440,801 | Hanford et al. | May 4, 1948 |
| 2,548,369 | Harwood et al. | Apr. 10, 1951 |
| 2,678,945 | Taylor | May 18, 1954 |